United States Patent [19]
Houle

[11] Patent Number: 5,829,745
[45] Date of Patent: Nov. 3, 1998

[54] VIDEO GAME CONTROL UNIT WITH SELF-CENTERING STEERING WHEEL

[75] Inventor: John M. Houle, Redwood City, Calif.

[73] Assignee: Home Arcade Systems, Inc., San Jose, Calif.

[21] Appl. No.: 412,139

[22] Filed: Mar. 28, 1995

[51] Int. Cl.[6] .................................................. A63F 9/22
[52] U.S. Cl. ..................... 273/148 B; 463/46; 463/47; 434/62
[58] Field of Search ................................ 273/148 B, 438, 273/85 R, 85 G, 86 R, 86 H; 434/29, 62, 373; 446/454, 230; 463/1, 46, 47

[56] References Cited

U.S. PATENT DOCUMENTS

| | | | |
|---|---|---|---|
| 3,479,750 | 11/1969 | Swanson | 434/62 |
| 4,276,030 | 6/1981 | Radice | 434/62 |
| 4,422,640 | 12/1983 | Tamarkin | 273/148 B X |
| 4,573,682 | 3/1986 | Mayon | 273/148 B X |
| 4,630,823 | 12/1986 | Grant | 273/148 B |
| 4,659,313 | 4/1987 | Kuster et al. | 273/438 X |
| 5,056,787 | 10/1991 | Mitsuyoshi | 273/148 B |
| 5,207,791 | 5/1993 | Scherbarth | 273/148 B |
| 5,275,565 | 1/1994 | Moncrief . | |
| 5,324,036 | 6/1994 | Morrow | 273/148 B |
| 5,354,202 | 10/1994 | Moncrief et al. . | |
| 5,368,484 | 11/1994 | Copperman et al. . | |
| 5,370,536 | 12/1994 | Chuang . | |

*Primary Examiner*—Raleigh W. Chiu
*Attorney, Agent, or Firm*—Donald E. Schreiber

[57] ABSTRACT

A video game control unit includes separable console and base sections, with the console section housing a steering wheel video game input device that automatically returns to a central, neutral position. The base section of the video game control unit includes a baseplate, a pedestal and a tray, with the pedestal affixed on the baseplate and the tray resting on and affixed to the pedestal. The tray is flat and bounded by four walls which hold the removable console section in place on the tray. The steering wheel video game input device automatically returns to its central position by means of a restorative force applied by ball bearings received in the ends of coil springs and urged against a V-shaped centering cam which is locked onto a steering shaft connected to the steering wheel. Provisions are included for providing left-turn and right-turn signals to a computer interface circuit included in the console housing. Computer input button switches mounted on the console housing and on spokes of the steering wheel frame provide discrete signals to the computer interface circuit. Electrical signals between the computer interface circuit and a digital computer are carried on a game port cable which exits the rear of the console housing.

17 Claims, 3 Drawing Sheets

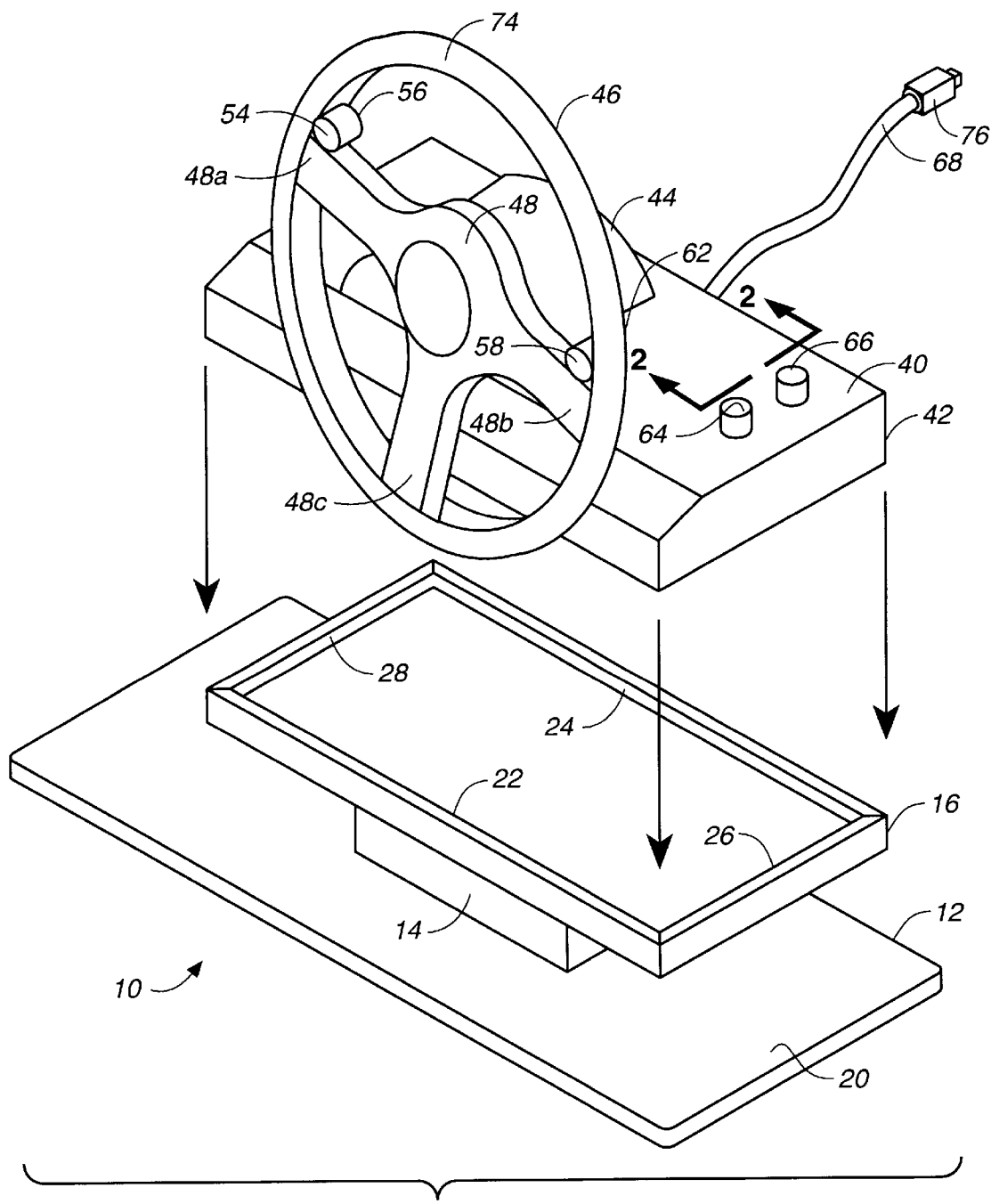
FIG._1

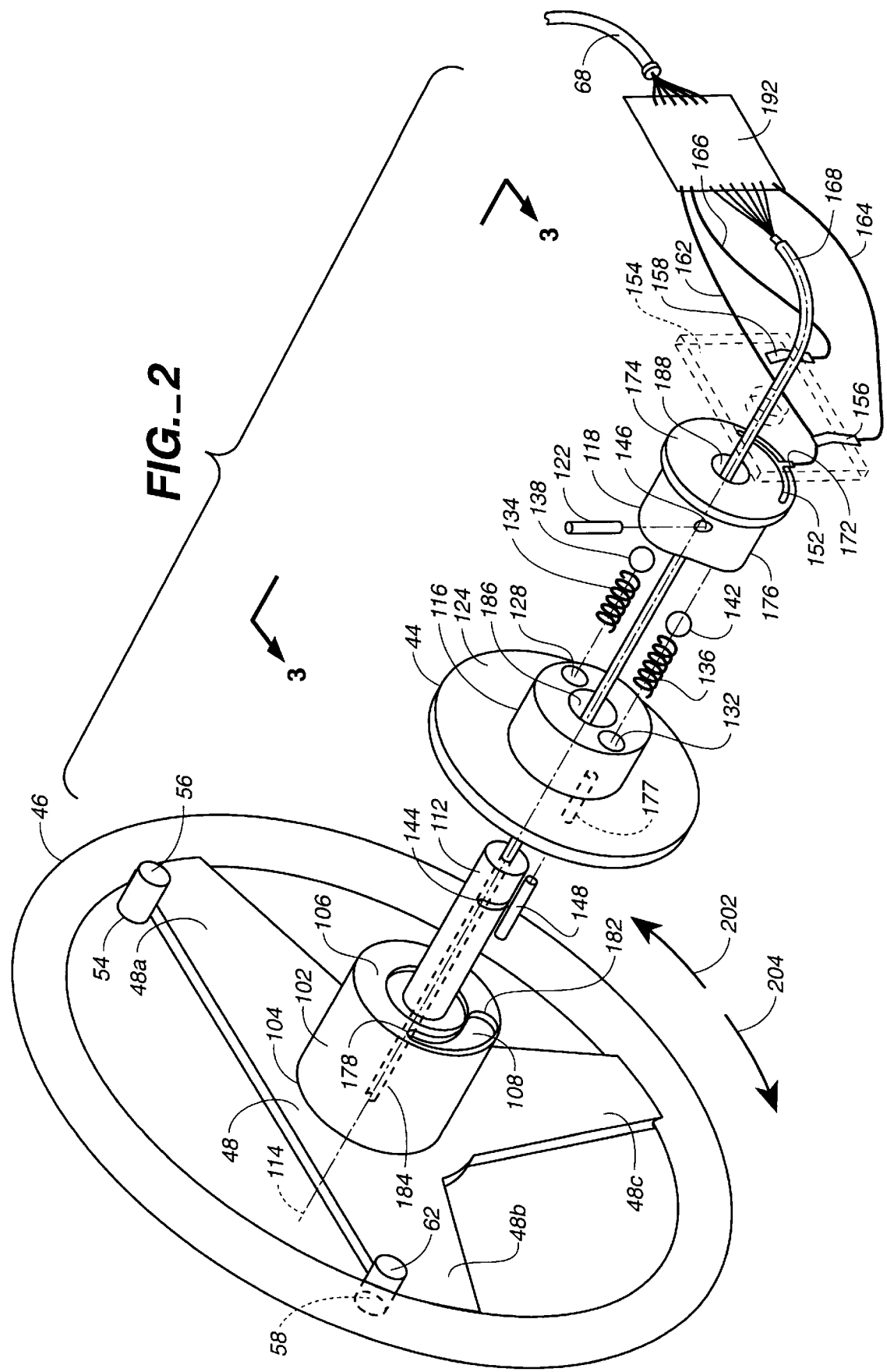
FIG._2

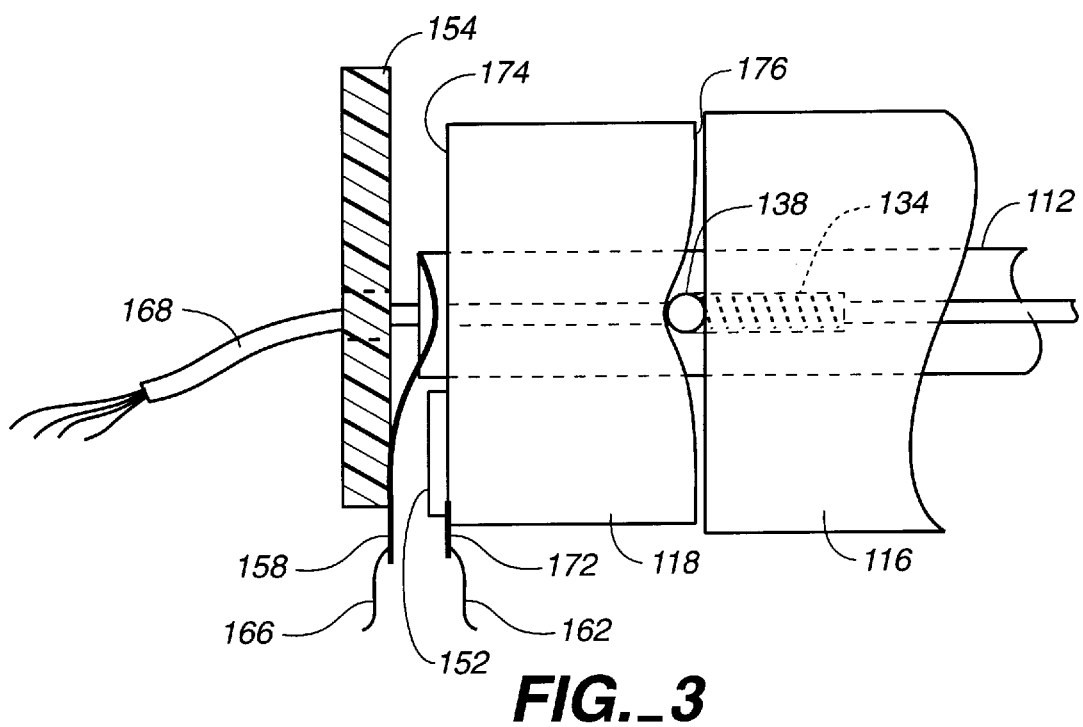
FIG._3

VIDEO GAME CONTROL UNIT WITH SELF-CENTERING STEERING WHEEL

CROSS-REFERENCE TO RELATED APPLICATION

None.

BACKGROUND OF THE INVENTION

1. Field of the Invention

The present invention relates generally to video game control units and devices, and particularly to video game control units which house steering wheel video game input devices. More particularly, this invention relates to a video game control unit having separable console and base sections, with the console section housing a steering wheel video game input device that automatically returns to its central position.

2. Description of the Prior Art

Computer applications, including video games, employ various different types of devices for inputting information into a computer program in various different formats. For example, keyboards input textual data. Buttons and switches input discrete data. Mice, trackballs, joysticks, flight simulator yokes and steering wheels input positional data permitting control of a video game along one or more spatial axes. Different models and styles of joysticks for flight simulator video games are ubiquitous. Such joysticks generally supply a restorative force which, if an operator releases the joystick, moves the joystick to a center, neutral position. Conversely, commercially available steering wheel video game input devices generally omit such a restorative force for automatically returning the steering wheel to its central, or straight ahead position upon being released by an operator. In addition to providing an appropriate tactile "feel" to an operator, all commercially viable computer and video game input devices must be sufficiently rugged so they are not easily damaged during use, or even by misuse. It appears that prior commercially marketed steering wheel video game input devices may have omitted inclusion of a restorative force for various different reasons including cost, reliability, size, weight, etc.

SUMMARY OF THE INVENTION

An object of the present invention is to provide a video game control unit that is convenient for use with computer games, video games, and vehicle simulation and training systems.

Another object of the present invention is to provide a video game control unit with separable console and base sections.

Yet another object of the present invention is to provide a video game control unit with a steering wheel video game input device.

Yet another object of the present invention is to provide a video game control unit with a steering wheel video game input device that automatically returns to its central position.

Yet another object of the present invention is to provide a steering wheel video game input device that provides a restorative force which is simple to manufacture and assemble.

Yet another object of the present invention is to provide a steering wheel video game input device that provides a restorative force which is economical to manufacture.

The present invention is in two sections, a base section and a console section. The base section includes a simple arrangement of a baseplate, a pedestal and a tray. The pedestal rests on and is affixed to the baseplate, and the tray rests on and is affixed to the pedestal. The tray is flat and is bounded by four walls.

The console section rests on the tray and is held in place by the four walls which surround the tray. The console section includes a molded console housing with an integral steering wheel mount and a self-centering computer input steering wheel device secured to the steering wheel mount. Computer input button switches mounted on the console housing and on spokes of the steering wheel frame are electrically connected to a conventional computer interface circuit board mounted within the console housing.

The computer input steering wheel device includes a steering wheel affixed to one end of a rod-shaped shaft with a centering cam locked to the opposite end of the shaft. The computer input steering wheel device achieves its self-centering capability by means of coil spring-loaded ball bearings opposing and urged against a V-shaped face of the centering cam. The ball bearings exert sufficient force against the centering cam to rotate the centering cam, the steering shaft and the steering wheel. If the steering wheel is rotated away from a central, neutral position, the V-shaped face of the centering cam drives the ball bearings back into apertures which house the coils springs. Driving the ball bearings back into the apertures increases the compression of the coil springs thereby correspondingly increasing the restorative force which the ball bearings apply to the centering cam.

The computer input steering wheel device provides left-turn and right-turn signals to the computer interface circuit by means of leaf spring contacts that press against an arcuate-shaped electrical contact mounted on a flat face of the centering cam. As the steering wheel is turned to the left-turn and right-turn direction, the arcuate-shaped electrical contact makes contact with left-turn and right-turn leaf spring contacts, respectively, thereby closing electrical circuits with the computer interface circuit. A game port cable, connecting the computer interface circuit to a digital computer, exits the rear of the console housing.

These and other features, objects and advantages will be understood or apparent to those of ordinary skill in the art from the following detailed description of the preferred embodiment of the invention as illustrated in the various drawing figures.

BRIEF DESCRIPTION OF THE DRAWINGS

FIG. 1 is a perspective view of a video game control unit together with its self-centering steering wheel video game input device.

FIG. 2 is an exploded partially sectioned perspective view of a video game control unit taken along the line 2—2 of FIG. 1.

FIG. 3 is an elevational view of a self-centering steering wheel video game input device taken along the line 3—3 of FIG. 2.

DETAILED DESCRIPTION OF THE PREFERRED EMBODIMENT

Referring to the drawings, FIG. 1 provides a perspective view of a video game control unit, including a self-centering steering wheel video game input device, with the entire unit referred to by the general reference character 10. The video game control unit 10 includes two sections, a base section 20 and a removable console section 40.

The base section 20 includes a baseplate 12, a pedestal 14 and a tray 16. The pedestal 14 is interposed between a top surface of the baseplate 12 and a bottom surface of the tray 16. The base section 20 is designed so that an operator (not illustrated in any of the FIGs.) sits on a chair (not illustrated in any of the FIGs.) or on the floor (not illustrated in any of the FIGs.) with one leg placed on each side of the pedestal 14. The tray 16 is designed to secure the removable console section 40 while an operator plays a game. The removable console section 40 rests on the top surface of the tray 16, and is held in place by a front wall 22, left side wall 28, rear wall 24, and right side wall 26 of the tray 16. The height of the pedestal 14 is selected to provide sufficient space for an operator's legs and to place the removable console section 40 at a comfortable operating height.

The removable console section 40 includes a molded console housing 42, which includes a steering wheel mount 44, and a self-centering steering wheel assembly 74 secured to the steering wheel mount 44. In the embodiment of the present invention shown in FIG. 1, the steering wheel mount 44 is a semi-cylindrically-shaped housing molded into the console housing 42. The steering wheel mount 44 may be an integral part of the console housing 42, or any shape housing, bracket, flange or other device mounted on the console housing 42 that affixes the self-centering steering wheel assembly 74 to the removable console section 40. However, it is preferred for the steering wheel mount 44 to be formed of an electrically insulating material.

The removable console section 40 has provisions for mounting computer input button switches. In the embodiment of the present invention shown in FIG. 1, two button switches 64 66 are mounted on the console housing 42, and four button switches 54 56 58 62 are mounted at ends of spokes 48a 48b of a steering wheel frame 48 included in a steering wheel 46 of the self-centering steering wheel assembly 74. Two of the button switches 54 58 mounted at the ends of the spokes 48a 48b face toward an operator while two of the buttons 56 62 mounted at ends of the spokes 48a 48b face away from an operator. Electrical connections between the console section 40 and a computer (not illustrated in any of the FIGs.) are provided by a game port cable 68 and game port connector 76 which exit the rear of the console housing 42.

FIG. 2 depicts an exploded, partially sectioned perspective view of the removable console section 40 taken along the line 2—2 of FIG. 1. A steering wheel hub 102 has a cylindrical shape, a flat front face 104 affixed to the wheel frame 48 at a juncture of the spokes 48a 48b 48c, and a flat rear face 106. The rear face 106 of the steering wheel hub 102 is formed with an arcuate-shaped groove 108. In the embodiment of the present invention, the arcuate-shaped groove 108 subtends an arc of approximately 50 degrees about the rear face of the steering wheel hub 102.

A steering shaft 112 is a cylindrical rod. A first end of the steering shaft 112 is affixed to the steering wheel hub 102. The steering shaft 112 passes through a first cylindrical aperture (not shown in any of the FIGs.) in the steering wheel mount 44 and a second cylindrical aperture 186 in a spring housing 116, and enters a third cylindrical aperture 188 in a centering cam 118. A retaining pin aperture 146 piercing the centering cam 118 aligns with a retaining pin slot 144 of the steering wheel shaft 112. A retaining pin 122 inserted into the retaining pin aperture 146, which mates with the retaining pin slot 144 in the steering shaft 112, locks the centering cam 118 to the steering shaft 112. The assemblage of the wheel 46, the wheel frame 48, the steering wheel hub 102, the steering shaft 112 and the centering cam 118 have a common rotation axis 114.

The spring housing 116 has a flat first face which is affixed to an interior surface 124 of the steering wheel mount 44. The spring housing 116 has a flat second face that is pierced by two round apertures 128 132 disposed diametrically opposite each other across the rotation axis 114. The two round apertures 128 132 each respectively receive a first end of a coil centering spring 134 136. A second end of each of the coil centering springs 134 136 respectively receives a ball bearing 138 142. Disposed in this position, a first V-shaped face 176 of the centering cam 118 contacts the ball bearings 138 142 so the coil centering springs 134 136 are compressed within the apertures 128 132 to such an extent that the ball bearings 138 142 are partially received within the apertures 128 132.

The coil centering springs 134 136 urge the ball bearings 138 142 toward the V-shaped face 176 of the centering cam 118 with sufficient force to rotate the centering cam 118, the steering shaft 112, and the steering wheel 46 about the rotation axis 114 to a neutral position in which the ball bearings 138 142 extend furthest out of the apertures 128 132. If the steering wheel 46 is manually rotated about the rotation axis 114 away from this neutral position, the V-shaped face 176 of the centering cam 118 drives the ball bearings 138 142 back into the apertures 128 132. Driving the ball bearings 138 142 bask into the apertures 128 132 increases the compression of the coil centering springs 134 136 thereby correspondingly increasing the restorative force which the ball bearings 138 142 apply to the centering cam 118.

A steering-range pin aperture 177 pierces the steering wheel mount 44 and spring housing 116 opposite the arcuate-shaped groove 108. A first end of a steering-range pin 148 is fixed in the steering-range pin aperture 177. A second end of the steering-range pin 148 is received within the arcuate-shaped groove 108. With the assemblage of the wheel 46, the wheel frame 48, the steering wheel hub 102, the steering shaft 112 and the centering cam 118 resting in the neutral position, the second end of the steering-range pin 148 is positioned approximately mid-way between a right-turn radial bound 178 and a left-turn radial bound 182 of the arcuate-shaped groove 108. With the steering-range pin 148 received within the arcuate-shaped groove 108, the right-turn radial bound 178 and left-turn radial bound 182 of the arcuate-shaped groove 108 define the range of rotation of the assemblage of the wheel 46, the wheel frame 48, the steering wheel hub 102, the steering shaft 112 and the centering cam 118.

FIG. 3 depicts an elevational view taken along the lines 3—3 of FIG. 2. Referring to both FIGS. 2 and 3, an arcuate-shaped electrical contact 152 is mounted on a second, flat face 174 of the centering cam 118. The arcuate-shaped electrical contact 152 is positioned so that it sweeps at a constant radial distance from the common rotation axis 114. The centering cam 118 is formed from an electrically insulating material.

A left-turn leaf spring contact 158 and a right-turn leaf spring contact 156 are both mounted to a leaf spring mounting plate 154 (depicted in phantom in FIG. 2). The left-turn leaf spring contact 158 and the right-turn leaf spring contact 156 are positioned so that both are firmly urged against the second, flat face 174 of the centering cam 118. The left-turn leaf spring contact 158 and the right-turn leaf spring contact 156 contact the flat second face 174 of the centering cam 118 at a radial distance from the common rotation axis 114 that is approximately equal to the radial distance of the arcuate-shaped electrical contact 152 from the rotation axis 114. The left-turn leaf spring contact 158 and the right-turn leaf spring contact 156 are positioned so that, with the centering cam 118 in the neutral position, neither the left-turn leaf spring contact 158 nor the right-turn left spring contact 156 contacts the arcuate-shaped electrical contact 152. As the steering wheel 46 is rotated in the right-turn direction, indicated by an arrow 202, the arcuate-shaped electrical contact 152 rotates under and makes contact with the right-turn leaf spring contact 156. As the steering wheel 46 is rotated in the left-turn direction, indicated by an arrow 204, the arcuate-shaped electrical contact 152 rotates under and makes contact with the left-turn leaf spring contact 158. The arcuate-shaped electrical contact 152 subtends an arc slightly larger than the arc subtended by the arcuate-shaped aperture 108 on the rear face 106 of the steering wheel hub 102, so that, with the steering wheel 46 turned to the radial bounds of its rotation in the right-turn direction 202, the arcuate-shaped electrical contact 152 remains in contact with the right-turn leaf spring contact 156, and with the steering wheel 46 turned to the radial bounds of its rotation in the left-turn direction 204, the cylindrical electrical contact 152 remains in contact with the left-turn leaf spring contact 158. In the embodiment of the present invention the cylindrical electrical contact 152 subtends an arc of approximately 60 degrees.

A first set of button switch signal wires 168 connects the button switches 54 56 58 62 mounted on the spokes 48a 48b with a computer interface circuit board 192 (FIG. 2) mounted within the console housing 42. The electronic circuit on the computer interface circuit board 192 is conventional and does not form any part of the present invention. The first set of button switch signal wires 168 leave the button switches 54 56 58 62, pierce the outer surface of the spokes 48a 48b, pass through conduits (not illustrated in any of the FIGs.) in the spokes 48a 48b, enter a tube 184 (illustrated in broken lines) passing within the steering wheel hub 106 and steering shaft 112, exit the tube 184 and connect to the computer interface circuit board 192. A right-turn signal wire 164 connects between the right-turn leaf spring contact 156 and the computer interface circuit board 192. A left-turn signal wire 166 connects between the left-turn leaf spring contact 158 and the computer interface circuit board 192. A turn indicator signal wire 162 connects between a projecting tab 172 of the arcuate-shaped electrical contact 152 and the computer interface circuit board 192. A second set of button switch signal wires (not illustrated in any of the FIGs.) connects between the switch buttons 64 66 mounted on the console housing 42 and the computer interface circuit board 192. A first end of the game port cable 68 connects to the computer interface circuit board 192. The game port cable 68 exits the rear of the console housing 42. A second end of the game port cable 68 connects to the game port connector 76.

Although the present invention has been described in terms of the presently preferred embodiments, it is to be understood that such disclosure is purely illustrative and is not to be interpreted as limited. Consequently, without departing from the spirit and scope of the invention, various alterations, modifications, and/or alternative applications of the invention will, no doubt, be suggested to those skilled in the art after having read the preceding disclosure. Accordingly, it is intended that the following claims be interpreted as encompassing all alterations, modifications or alternative applications as fall within the true spirit and scope of the invention.

What is claimed is:

1. A video game control unit comprising:
   a removable console section including:
      a console housing;
      a steering wheel video game input device having a rotation axis, a neutral position, a right-turn direction and a left-turn direction, said steering wheel video game input device including:
         a steering wheel;
         a rod-shaped steering shaft that is secured to and supported by said console housing, said steering shaft extending parallel to and surrounding said rotation axis, with a first end of said steering shaft being affixed to said steering wheel; and
         means for providing a restorative force to return said steering wheel video came input device to the neutral position, said means for providing a restorative force including a cylindrically-shaped centering cam having a V-shaped first face and a flat second face disposed normal to said rotation axis, said centering cam being attached to and retained on said steering shaft;
      means for limiting rotation of said steering wheel video game input device about said rotation axis in both the left-turn and right-turn directions;
      means for electrically interfacing said console section with a digital computer; and
      means for providing electrical right-turn and left-turn indication signals to said digital computer interfacing means; and
   a base section including:
      a baseplate having a top surface and a bottom surface;
      a tray having a top surface, a bottom surface and means for retaining said removable console section on said top surface of said tray;
      a pedestal interposed between said top surface of said baseplate and said bottom surface of said tray, securing said tray to said baseplate, for supporting said tray at a predetermined height above said baseplate.

2. The video game control unit of claim 1 wherein said means for retaining said removable console section on said top surface of said tray comprises:
   a front wall abutting said top surface of said tray;
   a back wall abutting said top surface of said tray;
   a right side wall abutting said top surface of said tray, said right side wall extending from said front wall to said rear wall; and
   a left side wall abutting said top surface of said tray, said left side wall extending from said front wall to said rear wall.

3. The video game control unit of claim 1 wherein said console housing further comprises a computer input button switch electrically connected to said means for electrically interfacing said console section with a digital computer.

4. The video game control unit of claim 1 wherein said centering cam is attached to and retained on said steering shaft by:
   a retaining pin slot formed on said steering wheel shaft;
   a retaining pin aperture piercing said centering cam; and
   a retaining pin inserted into said retaining pin aperture and mating with said retaining pin slot thereby locking said centering cam to said steering shaft.

5. The video game control unit of claim 1 wherein said means for providing a restorative force for returning said steering wheel video game input device to the neutral position further comprises:
   a spring housing, having a first face and a second face disposed normal to said rotation axis, said housing also being pierced by a cylindrical aperture centered about said axis of rotation, said first face being affixed to said console housing, said second face being juxtaposed with said V-shaped first face of said centering cam and pierced by two round apertures, said round apertures being disposed diametrically opposite each other across said rotation axis;

coil centering springs having a first end and a second end, the first end of each coil centering spring being received respectively into one of said round apertures in said spring housing; and ball bearings received respectively in said second end of each of said coil centering springs, whereby said V-shaped face of said centering cam contacts said ball bearings thereby compressing said coil centering springs within said round apertures in said spring housing to such an extent that said ball bearings are partially received within said round apertures in said spring housing, and whereby said coil centering springs urge said ball bearings toward the V-shaped face of said centering cam with sufficient force to rotate said centering cam, said steering shaft and said steering wheel about said rotation axis to the neutral position in which said ball bearings extend furthest out of said round apertures in said spring housing, and further if said steering wheel is manually rotated about said rotation axis away from the neutral position, the V-shaped face of said centering cam drives said ball bearings back into said round apertures in said spring housing, thereby increasing the compression of said coil centering springs, thereby correspondingly increasing the restorative force which said ball bearings apply to the V-shaped face of said centering cam.

6. The video game control unit of claim 1, wherein said steering wheel comprises:

a circular wheel disposed normal to said rotation axis;

a plurality of spokes, each spoke having first and second ends, with the first end of each said spoke affixed to said circular wheel; and a hub, having a first face and a second face disposed normal to said rotation axis, with the first face of said hub affixed to a juncture of the second ends of said spokes.

7. The video game control unit of claim 6, wherein said means for limiting the turning angle of said steering wheel in both the left-turn and right-turn directions comprises:

an arcuate-shaped groove formed into said second face of said hub and having a radial range, a first, right-turn radial bound and a second, left-turn radial bound;

a steering-range pin aperture piercing said mounting means on said console housing, and further piercing the first face of said spring housing, said aperture being disposed opposite said arcuate-shaped groove in said second face of said hub; and a steering-range pin having a first end and a second end, the first end of said steering-range pin being inserted into and fixed in said steering-range aperture, the second end of said steering-range pin being received within said arcuate-shaped groove in said second face of said hub, and with said steering wheel in the neutral position, the second end of said steering-range pin being positioned approximately mid-way within the radial range of said arcuate-shaped groove, so that if said steering wheel is manually rotated about said rotation axis away from the neutral position in the right-turn direction until the right-turn radial bound of the arcuate-shaped groove contacts said steering-range pin preventing further rotation of said steering wheel in the right-turn direction, and so that if said steering wheel is manually rotated about said rotation axis away from the neutral position in the left-turn direction until the left-turn radial bound of the arcuate-shaped groove contacts said steering-range pin preventing further rotation of said steering wheel in the left-turn direction.

8. The video game control unit of claim 6, wherein said video game control unit further comprises a computer input button switch mounted on one of said spokes and electrically connected to said means for electrically interfacing said console section with a digital computer.

9. The video game control unit of claim 6 wherein said centering cam is formed from an electrically insulating material and said means for providing electrical right-turn and left-turn indication signals to said digital computer interfacing means comprises:

an arcuate-shaped electrical contact mounted on the flat second face of said centering cam, with said arcuate-shaped electrical contact positioned so that said arcuate-shaped electrical contact sweeps at a constant radial distance from said rotation axis, and with said arcuate-shaped electrical contact sweeping an angle slightly larger than a radial range established by said means for limiting rotation of said steering wheel video same input device about said rotation axis, said arcuate-shaped electrical contact being electrically connected to said digital computer interfacing means;

a leaf spring mounting plate, formed from electrically insulating material, and mounted within said console housing;

a right-turn leaf spring contact, mounted to said leaf spring mounting plate and positioned so that said right-turn leaf-spring contact is firmly urged against the second flat face of said centering cam at a radial distance from said rotation axis that is approximately equal to the radial distance of said arcuate-shaped electrical contact from said rotation axis, and further positioned so that, with said centering cam in the neutral position, said right-turn leaf spring contact does not contact said arcuate-shaped electrical contact, said right-turn leaf electrical contact being electrically connected to said digital computer interfacing means;

a left-turn leaf spring contact, mounted to said leaf spring mounting plate and positioned so that said left-turn leaf-spring contact is firmly urged against the second flat face of said centering cam at a radial distance from said rotation axis that is approximately equal to the radial distance of said arcuate-shaped electrical contact from said rotation axis, and further positioned so that, with said centering cam in the neutral position, said left-turn leaf spring contact does not contact said arcuate-shaped electrical contact, said left-turn leaf-spring contact being electrically connected to said digital computer interfacing means;

wherein if said steering wheel is manually rotated about said rotation axis away from the neutral position in the right-turn direction, said arcuate-shaped electrical contact rotates under and makes contact with said right-turn leaf spring contact, thereby closing an electrical connection from said digital computer interfacing means through said arcuate-shaped electrical contact to said right-turn leaf-spring contact back to said digital computer interfacing means; and wherein if said steering wheel is manually rotated about said rotation axis away from the neutral position in the left-turn direction, said arcuate-shaped electrical contact rotates under and makes contact with said left-turn leaf spring contact, thereby closing an electrical connection from said digital computer interfacing means through said arcuate-shaped electrical contact to said left-turn leaf-spring contact back to said digital computer interfacing means.

10. A video game control console comprising:

a console housing;

a steering wheel video game input device having a rotation axis, a neutral position, a right-turn direction and a left-turn direction, said steering wheel video game input device including:
 a steering wheel;
 a rod-shaped steering shaft that is secured to and supported by said console housing, said steering shaft extending parallel to and surrounding said rotation axis, with a first end of said steering shaft being affixed to said steering wheel; and
 means for providing a restorative force to return said steering wheel video game input device to the neutral position, said means for providing a restorative force including a cylindrically-shaped centering cam having a V-shaped first face and a flat second face disposed normal to said rotation axis, said centering cam being attached to and retained on said steering shaft;

means for limiting rotation of said steering wheel video game input device about said rotation axis in both the left-turn and right-turn directions;

means for electrically interfacing said video game control console with a digital computer; and means for providing electrical right-turn and left-turn indication signals to said digital computer interfacing means.

11. The video game control console of claim 10 wherein said centering cam is attached to and retained on said steering shaft by:
 a retaining pin slot formed on said steering wheel shaft;
 a retaining pin aperture piercing said centering cam; and
 a retaining pin inserted into said retaining pin aperture and mating with said retaining pin slot thereby locking said centering cam to said steering shaft.

12. The video game control console of claim 10 wherein said means for providing a restorative force for returning said steering wheel video game input device to the neutral position further comprises:
 a spring housing, having a first face and a second face disposed normal to said rotation axis, said housing also being pierced by a cylindrical aperture centered about said axis of rotation, said first face being affixed to said console housing, said second face being juxtaposed with said V-shaped first face of said centering cam and pierced by two round apertures, said round apertures being disposed diametrically opposite each other across said rotation axis;
 coil centering springs having a first end and a second end, the first end of each coil centering spring being received respectively into one of said round apertures in said spring housing; and
 ball bearings received respectively in said second end of each of said coil centering springs, whereby said V-shaped face of said centering cam contacts said ball bearings thereby compressing said coil centering springs within said round apertures in said spring housing to such an extent that said ball bearings are partially received within said round apertures in said spring housing, and whereby said coil centering springs urge said ball bearings toward the V-shaped face of said centering cam with sufficient force to rotate said centering cam, said steering shaft and said steering wheel about said rotation axis to the neutral position in which said ball bearings extend furthest out of said round apertures in said spring housing, and further if said steering wheel is manually rotated about said rotation axis away from the neutral position, the V-shaped face of said centering cam drives said ball bearings back into said round apertures in said spring housing, thereby increasing the compression of said coil centering springs, thereby correspondingly increasing the restorative force which said ball bearings apply to the V-shaped face of said centering cam.

13. The video game control console of claim 10, wherein said steering wheel comprises:
 a circular wheel disposed normal to said rotation axis;
 a plurality of spokes, each spoke having first and second ends, with the first end of each said spoke affixed to said circular wheel; and
 a hub, having a first face and a second face disposed normal to said rotation axis, with the first face of said hub affixed to a juncture of the second ends of said spokes.

14. The video game control console of claim 13, wherein said means for limiting the turning angle of said steering wheel in both the left-turn and right-turn directions comprises:
 an arcuate-shaped groove formed into said second face of said hub and having a radial range, a first, right-turn radial bound and a second, left-turn radial bound;
 a steering-range pin aperture piercing said mounting means on said console housing, and further piercing the first face of said spring housing, said aperture being disposed opposite said arcuate-shaped groove in said second face of said hub; and
 a steering-range pin having a first end and a second end, the first end of said steering-range pin being inserted into and fixed in said steering-range aperture, the second end of said steering-range pin being received within said arcuate-shaped groove in said second face of said hubs and with said steering wheel in the neutral position, the second end of said steering-range pin being positioned approximately mid-way within the radial range of said arcuate-shaped groove, so that if said steering wheel is manually rotated about said rotation axis away from the neutral position in the right-turn direction until the right-turn radial bound of the arcuate-shaped groove contacts said steering-range pin preventing further rotation of said steering wheel in the right-turn direction and so that if said steering wheel is manually rotated about said rotation axis away from the neutral position in the left-turn direction until the left-turn radial bound of the arcuate-shaped groove contacts said steering-range pin preventing further rotation of said steering wheel in the left-turn direction.

15. The video game control console of claim 13, wherein said steering wheel video game input device further comprises a computer input button switch mounted on one of said spokes and electrically connected to said digital computer interfacing means.

16. The video game control console of claim 13 wherein said centering cam is formed from an electrically insulating material and said means for providing electrical right-turn and left-turn indication signals to said digital computer interfacing means comprises:

an arcuate-shaped electrical contact mounted on the flat second face of said centering cam, with said arcuate-shaped electrical contact positioned so that said arcuate-shaped electrical contact sweeps at a constant radial distance from said rotation axis, and with said arcuate-shaped electrical contact sweeping an angle slightly larger than a radial range established by said means for limiting rotation of said steering wheel video game input device about said rotation axis, said arcuate-shaped electrical contact being electrically connected to said digital computer interfacing means;

a leaf spring mounting plate, formed from electrically insulating material, and mounted within said console housing;

a right-turn leaf spring contact, mounted to said leaf spring mounting plate and positioned so that said right-turn leaf-spring contact is firmly urged against the second flat face of said centering cam at a radial distance from said rotation axis that is approximately equal to the radial distance of said arcuate-shaped electrical contact from said rotation axis, and further positioned so that, with said centering cam in the neutral position, said right-turn leaf spring contact does not contact said arcuate-shaped electrical contact, said right-turn leaf electrical contact being electrically connected to said digital computer interfacing means;

a left-turn leaf spring contact, mounted to said leaf spring mounting plate and positioned so that said left-turn leaf-spring contact is firmly urged against the second flat face of said centering cam at a radial distance from said rotation axis that is approximately equal to the radial distance of said arcuate-shaped electrical contact from said rotation axis, and further positioned so that, with said centering cam in the neutral position, said left-turn leaf spring contact does not contact said arcuate-shaped electrical contact, said left-turn leaf-spring contact being electrically connected to said digital computer interfacing means;

wherein if said steering wheel is manually rotated about said rotation axis away from the neutral position in the right-turn direction, said arcuate-shaped electrical contact rotates under and makes contact with said right-turn leaf spring contact, thereby closing an electrical connection from said digital computer interfacing means through said arcuate-shaped electrical contact to said right-turn leaf-spring contact back to said digital computer interfacing means; and wherein if said steering wheel is manually rotated about said rotation axis away from the neutral position in the left-turn direction, said arcuate-shaped electrical contact rotates under and makes contact with said left-turn leaf spring contact, thereby closing an electrical connection from said digital computer interfacing means through said arcuate-shaped electrical contact to said left-turn leaf-spring contact back to said digital computer interfacing means.

17. The video game control unit of claim 10 wherein said console housing further comprises a computer input button switch electrically connected to said means for electrically interfacing said video game control console with a digital computer.

* * * * *